United States Patent Office 3,206,341
Patented Sept. 14, 1965

3,206,341
FUEL BLOCKS, IN PARTICULAR FOR USE IN ROCKET ENGINES
Francis Reynaud and André Moutet, Villaine par Massy, France, assignors to Office National d'Etudes et de Recherches Aerospatiales O.N.E.R.A., Chatillon-sous-Bagneux, France, a body corporate of France
No Drawing. Filed Feb. 11, 1963, Ser. No. 257,716
Claims priority, application France, Feb. 12, 1962, 887,787; Nov. 20, 1962, 916,052
26 Claims. (Cl. 149—2)

The present invention relates to blocks having the character of a fuel with respect to an oxidizer (this last term being taken in its broadest sense, i.e. a participant in a chemical reaction which accepts electrons from another reactant, which constitutes the "fuel"), said blocks being cohesive at ordinary temperature, that is to say containing necessarily at least one component solid at this temperature. The invention is more especially concerned with blocks of this kind intended to be used as fuel in a rocket, such a form of fuel being hereinafter called "lithergol" fuel.

The object of the present invention is to provide a fuel block of this kind which is better adapted to comply with the requirements of practice, in particular concerning energetic performance and storing and handling possibilities.

According to the present invention such a block, at ordinary temperature, comprises a solid alveolate network or support divided into a multiplicity of cells, formed by at least one polyamide fuel solid at ordinary temperature, and a nitrogen containing component formed by at least one nitrogen containing substance, said last mentioned component being distributed among said cells and being in one of the following states: solid, jelly-like, viscous or liquid.

Otherwise stated, a fuel block according to the present invention comprises at least one polyamide fuel, solid at ordinary temperature, forming a component of a container or support, divided into a multiplicity of cells, and, inside said cells, at least one nitrogen containing fuel component.

It should be well understood that the term polyamide designates a substance characterized by the following group

and results from the following reaction between an amine and an acid:

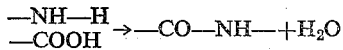

The following description relates to lithergol fuel blocks for rocket engines including, retained in a support consisting chiefly of at least one polyamide, a fuel consisting chiefly of at least one nitrogen containing fuel substance having always a hypergolic character with respect to the oxidizer to be used (which may be an oxygen containing substance or a substance introducing a halogen into the reaction, for instance fluorine or a fluorine containing substance such as $F_3Cl$), this fuel component being hereinafter called "nitrogen containing component."

The term "hypergolic," applied to a fuel to be used with a give oxidizer, means that this fuel is capable of reacting spontaneously with said oxidizer when merely brought into the presence thereof, without it being necessary to start the reaction by external means.

Among the polyamides which may be used according to the invention (and which may be either hypergolic or not according to the oxidizer fluid that is used therewith) are those designated as follows:

66/6/610 (melting point 140° C.–145° C.)
66/6 (melting point 175° C.–185° C.)
610 (melting point 215° C.–220° C.)
66 (melting point 255° C.)
66/6 (melting point 195° C.–200° C.)

These designations are given in pages 916 and 917 of the Encyclopedia of Chemical Technology of Kirk and Othmer published by Interscience Encyclopedia Inc., New York.

Concerning the nitrogen containing components which may be used the following may be cited:

Components solid at 25° C., and consisting of amines:

Paratoluidine,
Asymmetric orthoxylidine,
Metaphenylene diamine,
Orthophenylene diamine,
Paraphenylene diamine,
Para-anisidine,
2-amino-pyridine,
Metatoluene diamine, Components liquid at 25° C.:

Consisting of amines—
        Metatoluidine,
        Aniline,
        Diethylene triamine,
    Consisting of hydrazines—
        Phenyl-hydrazine,
    Consisting of pyridines—
        Pyridine.

As for additional charges which may be incorporated in the lithergol to improve the properties thereof, they may include powders of light metals such as aluminum, zirconium, beryllium, magnesium and lithium.

Concerning the relative proportions of the components of the block, they are preferably as follows (by weight):

Polyamide (or polyamides) from 10% to 30% and preferably from 15% to 20%;
Nitrogen containing substance (or substances) from 90% to 70% and preferably from 85% to 80%.

When use is made of one or several additional charges, they preferably do not exceed 30% of the total weight, and may range, for instance, from 10% to 30%. Preferably, they average 20% of said weight.

Concerning now the methods of making the fuel block, it is advantageous to proceed as follows:

The nitrogen containing substance or substances and the polyamide or polyamides (which is for instance in the granular or powdered state) are heated together gradually, while being stirred, at a temperature and during a time such that a homogeneous solution is obtained, this result being generally obtained by heating at a temperature of 150° C.–170° C.

And the homogeneous solution thus obtained is poured into a suitable mould, where it is cooled down, and allowed to set.

In some cases, in particular with nitrogen containing substances having a high boiling point (from 200° C. to 250° C.), the heating treatment is effected in an open vessel. However, it seems preferable, as a rule, to work with a closed vessel provided with a vapour condenser.

When an additional charge is to be added, this charge may be introduced at the beginning of the process, but it seems preferable first to form a solution of the nitrogen containing substance, or substances, and of the polyamide, or polyamides, and then to introduce said additional charge in the homogeneous solution that has been formed.

It should be pointed out that in most cases, when cooling or setting, the whole mass undergoes a very particular phenomenon which results in the obtainment of a composite structure, as may be found out by optical examination and/or by some physical test.

This composite structure comprises two main elements to wit:

On the one hand, an alveolate network of a solid material consisting of the polyamide, or polyamides, or containing a high proportion thereof, the term "alveolate" being taken in a very broad meaning and includes any porous or sponge-like structure, the cavities of which may or may not communicate together, and On the other hand, a phase constituted by the nitrogen containing substance, or substances, or at least very rich therein, this phase, which may be solid, liquid, jelly-like or viscous at ordinary temperature, being distributed in the alveolate network.

In other words the lithergol that is obtained is in the form of a kind of solid (this term meaning more or less rigid) support forming an alveolate network in which the nitrogen containing component is distributed.

If sweating off of the nitrogen containing component from the alveolate network is detrimental, this drawback may be obviated by coating the surface of the block intended to be in contact with the oxidiser with a fluid-tight substance solid at ambient temperature and which must be capable of reacting spontaneously with said oxidizer, that is to say must be hypergolic therewith.

In some cases, it happens that cooling of the treated mass and solidification thereof are accompanied by a separation of the solution that is being cooled into two portions, an upper and a lower one, the upper portion being richer in the nitrogen containing component than the lower one, this upper portion being either solid or liquid at ordinary temperature.

Anyway the lower portion, which is solid, always has the above described character of an alveolate network, whereas the upper portion, when it is solid at ordinary temperature, may also, or may not, have this alveolate character.

The lower portion and the upper portion, when the latter is solid, may possibly be both used as a single block in the same rocket motor, but they may be separated from each other and used separately (i.e. either in different rocket engines respectively, or in different portions of the combustion chamber of the same rocket engine).

Now, by way of example we will consider the case where the nitrogen containing component is paratoluidine and the polyamide is 66/6/610.

When the percentage of 66/6/610 polyamide is sufficiently high, for instance 20% by weight, we obtain a single alveolate block.

But if the percentage of 66/6/610 polyamide is lower, ranging for instance from 10% to 15%, cooling of the solution is accompanied by separation into two portions, the upper portion being richer in paratoluidine than the lower portion.

As an example of a nitrogen containing component liquid at ordinary temperature, one may cite ortho-toluidine, to be placed in solution with a 66/6 polyamide (having a melting point of 175° C.–185° C.). When the proportion of this polyamide (by weight) is for instance 20%, the whole mass is alveolate, whereas, when this proportion is for instance only 10%, separation into two portions, the lower one of which is alveolate, is observed.

It should be pointed out that it is possible in some cases to improve some characteristics of the lithergol (in particular the mechanical resistance of its alveolate network) by incorporating thereto a plasticizer, such for instance as glycerol.

Some examples of lithergol compositions according to the invention will now be given, said lithergols containing a polyamide and at least one solid or liquid (at 25° C.) nitrogen containing component, possibly with the addition of charges, as above mentioned.

I. Examples of lithergols where the nitrogen containing component is solid at 25° C.:

|   |   | Percent |
|---|---|---|
| 1. | 66/6/610 | 20 |
|    | Paratoluidine | 80 |
| 2. | 66/6/610 | 25 |
|    | Asymmetric orthoxylidine | 75 |
| 3. | 66/6/610 | 15 |
|    | Metatoluene diamine | 85 |
| 4. | 66/6/610 | 20 |
|    | Metaphenylene diamine | 80 |
| 5. | 66/6/610 | 15 |
|    | Paraphenylene diamine | 85 |
| 6. | 66/6/610 | 20 |
|    | Orthophenylene diamine | 80 |
| 7. | 66/6/610 | 20 |
|    | Paratoluidine | 40 |
|    | Metatoluene diamine | 40 |
| 8. | 66/6/610 | 20 |
|    | Paratoluidine | 55 |
|    | Metatoluene diamine | 25 |
| 9. | 66/6/610 | 20 |
|    | Asymmetric orthoxylidine | 40 |
|    | Metatoluene diamine | 40 |
| 10. | 66/6/610 | 25 |
|    | Asymmetric orthoxylidine | 37.5 |
|    | Paratoluidine | 37.5 |
| 11. | 66/6/610 | 14 |
|    | Glycerol | 6 |
|    | Metatoluene diamine | 80 |
| 12. | 66/6/610 | 20 |
|    | Para-anisidine | 80 |
| 13. | 66/6 (melt. point 175° C.– 185° C.) | 20 |
|    | Para-anisidine | 80 |
| 14. | 66/6/610 | 20 |
|    | 2-amino-pyridine | 80 |
| 15. | 66/6 (melt. point 175° C.–185° C.) | 20 |
|    | 2-amino-pyridine | 80 |

II. Examples of lithergols where the nitrogen containing component is solid at 25° C., further containing additional aluminum charges:

|   |   | Percent |
|---|---|---|
| 16. | 66/6/610 | 16 |
|    | Paratoluidine | 64 |
|    | Aluminum | 20 |
| 17. | 66/6/610 | 20 |
|    | Asymmetric orthoxylidine | 60 |
|    | Aluminum | 20 |
| 18. | 66/6/610 | 12 |
|    | Asymmetric orthoxylidine | 68 |
|    | Aluminum | 20 |
| 19. | 66/6/610 | 12 |
|    | Paraphenylene diamine | 68 |
|    | Aluminum | 20 |
| 20. | 66/6/610 | 26 |
|    | Paratoluidine | 32 |
|    | Metatoluene diamine | 32 |
|    | Aluminum | 20 |
| 21. | 66/6/610 | 16 |
|    | Asymmetric orthoxylidine | 32 |
|    | Metatoluene diamine | 32 |
|    | Aluminum | 20 |
| 22. | 66/6/610 | 20 |
|    | Paratoluidine | 30 |
|    | Asymmetric orthoxylidine | 30 |
|    | Aluminum | 20 |

III. Examples of lithergols where the nitrogen containing component is liquid at 25° C.:

|   |   | Percent |
|---|---|---|
| 23. | 66/6/610 | 20 |
|    | Phenyl-hydrazine | 80 |
| 24. | 66/6/610 | 15 |
|    | Phenyl-hydrazine | 85 |
| 25. | 66/6 (melt. point 175° C.– 185° C.) | 20 |
|    | Phenyl-hydrazine | 80 |
| 26. | 66/6 (melt. point 195° C.–200° C.) | 20 |
|    | Phenyl-hydrazine | 80 |

27. 610 _____ 20
    Phenyl-hydrazine _____ 80
28. 66/6 (melt. point 175° C.–185° C.)_____ 20
    Ortho-toluidine _____ 80
29. 66/6 (melt. point 175° C.–185° C.)_____ 22
    Ortho-toluidine _____ 78

IV. Examples of lithergols where the nitrogen containing component is liquid at 25° C., further containing additional aluminum charges:

Percent
30. 66/6 (melt. point 175° C.–185° C.)_____ 16
    Phenyl-hydrazine _____ 64
    Aluminum _____ 20
31. 66/6 (melt. point 175° C.–185° C.)_____ 14
    Phenyl-hydrazine _____ 56
    Aluminum _____ 30
32. 610 _____ 16
    Phenyl-hydrazine _____ 64
    Aluminum _____ 20
33. 66/6 (melt. point 175° C.–185° C.)_____ 17.6
    Ortho-toluidine _____ 62.4
    Aluminum _____ 20

Finally, it is possibe, according to the invention, when the nitrogen ontaining component distributed in the alveolate network is liquid and has a tendency to sweat off, to obviate this drawback by using means which thicken said component or even, when said component is liquid at 25° C., to make use of means transforming it into a viscous or jellified substance, the tendency of which to sweat off is reduced or even practically eliminated.

Thus, for instance, it is possible, when the nitrogen containing substance of the mixture is phenyl-hydrazine, which is liquid and has some tendency to sweat off at 25° C., to thicken this component in one of the following manners:

(a) By incorporation of cellulose acetate or any other substance capable of forming a film, in proportions which may reach 10%;

(b) By reaction with an isocyanate (for instance toluene diisocyanate), which reacts with a portion of the phenyl-hydrazine to give a substituted urea (polyurethane) which dissolves in the remainder of phenyl-hydrazine, thus increasing the viscosity thereof, the initial proportion by weight of isocyanate being, for instance, 12% in a material containing 18% of 66/6 polyamide (melting point 175° C.–185° C.) and 70% of phenyl-hydrazine;

(c) By forming within the mass of phenyl-hydrazine a substituted urea obtained by reaction of an isocyanate with another amine, for instance by reaction of toluene diisocyanate with heaxmethylene diamine;

(d) By dissolving in said phenyl-hydrazine another nitrogen containing component having a much higher melting point, for instance benzoguanamine or urea;

(e) By incorporating into the block of fuel, when it is being formed, lithium, preferably in the metallic state but possibly included in a metallic compound such as lithium amidide ($NH_2Li$) or lithium hydride ($HLi$). The proportion of elementary lithium (either in the metal state or as a component of a metallic compound) thus incorporated into the fuel block is lower than 2% of the total weight of said block and preferably ranges from 0.1% to 0.6% of the total weight.

Experience teaches that such an incorporation of lithium (either in the state of metal or of a metallic compound), in the proportions above specified, considerably reduces and may even wholly eliminate the tendency of phenylhydrazine to sweat off from the alveolate structure forming the semi-rigid armature of the fuel block, the mechanical behaviour of this armature being practically not altered if the amount of lithium that is incorporated is within the above indicated preferential range of 0.1% to 0.6%.

It should be noted that the incorporation of lithium will be preferably in the form of the metal rather than in the form of a metallic compound (such as a lithium amidide and hydride), because lithium in the metal state is much less aggressive than its compounds, in particular concerning the reaction thereof with water, which reaction is weak in the case of lithium in the metal state, whereas it is very violent with compounds such as lithium amidide and hydride.

The use of lithium in the metallic form will therefore avoid the necessity of using a rigorously anydrous phenyl-hydrazine (as it would be preferable to do if lithium were incorporated in the form of amidide or hydride) and phenyl-hydrazine of technical quality, i.e., wherein the percentage of water is low, may be used.

In a general manner, it will be of interest to make use of phenyl-hydrazine containing at most 0.5% of water.

Concerning the relative proportions of phenyl-hydrazine and of polyamide, in particular of the 66/6/610 or the 66/6 (melting point 175° C.–185° C.) polyamide, it is preferable to choose a proportion of phenyl-hydrazine ranging from 70% to 90% of the total weight of the fuel block and still more preferably from 80% to 88% of said total weight, the proportion of polyamide then ranging from 30% to 10% and preferably from 20% to 12%. Of course, the proportions finally adopted for each of these two main components must take into account the proportion of lithium (either in the metallic state or belonging to a metallic compound) incorporated in the fuel block, and also the proportion of other charges as may be added, so that the total of the percentages of all the components truly corresponds to 100%.

To form a mixture as above described, phenyl-hydrazine and fragments of lithium (or powder of the lithium compound) are placed in a mixing apparatus and this mixture is heated to a temperature of about 90° C., where the reaction is started. If important amounts are treated, lithium, or the lithium compound, will be gradually introduced so as to maintain control of the reaction. The temperature is then allowed to rise gradually and when it is about 110° C. all the lithium has disappeared. Polyamide, such as 66/6/610 or 66/6 (melting point 175° C.–185° C.) in particular, is then added, after which the temperature is made to rise to about 150° C. to 160° C., so as to dissolve said polyamide. The mass is then poured into a mould of a shape corresponding to that of the fuel block to be obtained and the substance is cooled down.

Some examples of fuels will now be given which have, among other advantages:

That of being easy to prepare;

That of being not subject to sweating off of phenylhydrazine;

That of having a good mechanical behaviour; and

That of having very satisfactory combustion properties.

| | Percent of 66/6/610 polyamide | Percent of 66/6 polyamide (melt. point 175–185° C.) | Percent of phenyl-hydrazine | Percent of metallic lithium |
|---|---|---|---|---|
| 1st example | | 20 | 79.4 | 0.6 |
| 2d example | | 20 | 79.5 | 0.5 |
| 3d example | | 20 | 79.6 | 0.4 |
| 4th example | | 18 | 81.6 | 0.4 |
| 5th example | | 16 | 83.6 | 0.4 |
| 6th example | | 14 | 85.6 | 0.4 |
| 7th example | | 12 | 87.6 | 0.4 |
| 8th example | 20 | | 79.6 | 0.4 |
| 9th example | | 18 | 81.8 | 0.2 |
| 10th example | | 12 | 87.8 | 0.2 |

In the preceding description of various examples of the invention it has been assumed that the lithergol fuel block is hypergolic with the oxidizer fluid intended to flow through a channel formed in said block. It should be well understood that the invention is not limited to this case. The lithergol fuel block may also be not hypergolic with the oxidizer that is used. It will suffice, in this case, to provide means for starting the reaction which is to take place between the fuel and the oxidizer. Such means are well known in the art. They may be of the electric, electro-chemical, or other types.

In a general manner, while we have, in the above description, disclosed what we deem to be practical and efficient embodiments of the invention, it should be well understood that we do not wish to be limited thereto as there might be changes made in the composition, arrangement, disposition and form of the parts without departing from the principle of the present invention as comprehended within the scope of the appended claims.

What we claim is:

1. A fuel block which comprises, in combination, a solid alveolate support divided into a multiplicity of cells, formed by at least one polyamide fuel solid at ordinary temperature, and a nitrogen containing component consisting of at least one body of the group consisting of paratoluidine, asymmetric orthoxylidine, metaphenylene diamine, orthophenylene diamine, paraphenylene diamine, para-anisidine, 2-amino-pyridine and metatoluene diamine, said last mentioned component being distributed among said cells.

2. A fuel block which comprises, in combination, a solid alveolate support divided into a multiplicity of cells, formed by at least one polyamide fuel solid at ordinary temperature, and a nitrogen containing component consisting of at least one body of the group consisting of metatoluidine, aniline, ortho-toluidine and diethylene triamine, said last mentioned component being distributed among said cells.

3. A fuel block which comprises, in combination, a solid alveolate support divided into a multiplicity of cells, formed by at least one polyamide fuel solid at ordinary temperature and a nitrogen containing component comprising at least one pyridine, said last mentioned component being distributed among said cells.

4. A fuel block which comprises, in combination, a solid alveolate support divided into a multiplicity of cells, formed by at least one polyamide fuel solid at ordinary temperature and a nitrogen containing component consisting of pyridine, said last mentioned component being distributed among said cells.

5. A fuel block which comprises, in combination, a solid alveolate support divided into a multiplicity of cells, formed by at least one polyamide fuel solid at ordinary temperature and a nitrogen containing component comprising at least one hydrazine, said last mentioned component being distributed among said cells.

6. A fuel block which comprises, in combination, a solid alveolate support divided into a multiplicity of cells, formed by at least one polyamide fuel solid at ordinary temperature and a nitrogen containing component consisting of phenyl hydrazine, said last mentioned component being distributed among said cells.

7. A fuel block according to claim 6 further comprising cellulose acetate added to said phenyl-hydrazine to thicken it.

8. A fuel block according to claim 6 further comprising an isocyanate added to said phenyl-hydrazine to thicken it.

9. A fuel block according to claim 6 further comprising an isocyanate and another amine added to said phenyl-hydrazine to thicken it.

10. A fuel block according to claim 6 further comprising benzo-guanidine disclosed in said phenyl-hydrazine.

11. A fuel block according to claim 6 further comprising urea disclosed in said phenyl-hydrazine.

12. A fuel block according to claim 6 wherein the amount of phenyl-hydrazine ranges from 70 to 90 percent by weight, further comprising lithium.

13. A fuel block according to claim 6 wherein the amount of phenyl-hydrazine ranges from 80 to 88 percent by weight, further comprising lithium.

14. A fuel block which comprises, in combination, a solid alveolate support divided into a multiplicity of cells, formed by at least one polyamide fuel solid at ordinary temperature and a nitrogen containing component consisting of at least one body of the group consisting of paratoluidine, asymmetric orthoxylidine, metaphenylene diamine, orthophenylene diamine, paraphenylene diamine, para-anisidine, 2-amino-pyridine, metatoluene diamine, metatoluidine, aniline, orthotoluidine, diethylene triamine, pyridine and phenylhydrazine, said last mentioned component being distributed among said cells, said block further comprising at least one additional charge of a powder of a light metal.

15. A fuel block which comprises, in combination, a solid alveolate support divided into a multiplicity of cells, formed by at least one polyamide fuel solid at ordinary temperature and a nitrogen containing component consisting of at least one body of the group consisting of paratoluidine, asymmetric orthoxylidine, metaphenylene diamine, orthophenylene diamine, paraphenylene diamine, para-anisidine, 2-amino-pyridine, metatoluene diamine, metatoluidine, aniline, orthotoluidine, diethylene triamine, pyridine and phenyl-hydrazine, said last mentioned component being distributed among said cells, said block further comprising at least one additional charge of a powder of at least one metal of the group consisting of aluminum, zirconium, magnesium, beryllium and lithium.

16. A fuel block according to claim 15 wherein the proportion of said additional charge ranges from 10 to 30 percent by weight.

17. A fuel block according to claim 15 wherein lithium is in the metallic form.

18. A fuel block according to claim 15 wherein lithium is present in the form of a compound of the group consisting of lithium amidide and lithium hydride.

19. A fuel block according to claim 15 wherein the amount of lithium ranges from 0.1% to 2% of the total weight of the block.

20. A fuel block according to claim 15 wherein the amount of lithium ranges from 0.1% to 0.6% of the total weight of the block.

21. A fuel block which comprises, in combination, a solid alveolate support divided into a multiplicity of cells, formed by at least one polyamide fuel of the group consisting of 66/6/610, 66/6 of a melting point ranging from 175° C. to 185° C., 610, 66 and 66/6 of a melting point ranging from 195° C. to 200° C. and, a nitrogen containing component consisting of at least one body of the group consisting of paratoluidine, asymmetric orthoxylidine, metaphenylene diamine, orthophenylene diamine, paraphenylene diamine, para-anisidine, 2-amino-pyridine, metatoluene diamine, metatoluidine, aniline, ortho-toluidine, diethylene triamine, pyridine and phenylhydrazine, said last mentioned component being distributed among said cells.

22. A fuel block which comprises, in combination, from 10 to 30 percent by weight of a solid alveolate support divided into a multiplicity of cells, formed by at least one polyamide fuel solid at ordinary temperature and from 90 to 70 percent by weight of a nitrogen containing component consisting of at least one body of the group consisting of paratoluidine, asymmetric orthoxylidine, metaphenylene diamine, orthophenylene diamine, paraphenylene diamine, para-anisidine, 2-amino-pyridine, metatoluene diamine, metatoluidine, aniline, ortho-toluidine, diethylene triamine, pyridine and phenyl-hydrazine, said last mentioned component being distributed among said cells.

23. A fuel block which comprises, in combination, from 15 to 20 percent by weight of a solid alveolate support divided into a multiplicity of cells, formed by at least one polyamide fuel solid at ordinary temperature and from 85 to 80 percent by weight of a nitrogen containing component consisting of at least one body of the group consisting of paratoluidine, asymmetric orthoxylidine, metaphenylene diamine, orthophenylene diamine, paraphenylene diamine, para-anisidine, 2-amino-pyridine, metatoluene diamine, metatoluidine, aniline, ortho-toluidine, diethylene triamine, pyridine and phenyl-hydrazine, said last mentioned component being distributed among said cells.

24. A fuel block which comprises, in combination, a solid alveolate support divided into a multiplicity of cells, formed by at least one polyamide fuel solid at ordinary temperature and a nitrogen containing component consisting of at least one body of the group consisting of paratoluidine, asymmetric orthoxylidine, metaphenylene diamine, orthophenylene diamine, paraphenylene diamine, para-anisidine, 2-amino-pyridine, metatoluene diamine, metatoluidine, aniline, ortho-toluidine, diethylene triamine, pyridine and phenyl-hydrazine, said last mentioned component being distributed among said cells, said block further comprising a plasticizer.

25. A fuel block according to claim 24 wherein said plasticizer is glycerol.

26. The method of making a fuel block which comprises dissolving, at 140° C. to 200° C., at least one polyamide fuel of the group consisting of 66/6/610, 66/6 of a melting point ranging from 175° C. to 185° C., 610, 66 and 66/6 of a melting point ranging from 195° C. to 200° C. in at least one nitrogen component of the group consisting of at least one body of the group consisting of paratoluidine, asymmetric orthoxylidine, metaphenylene diamine, orthophenylene diamine, paraphenylene diamine, para-anisidine, 2-amido-pyridine, metatoluene diamine, metatoluidine, aniline, ortho-toluidine, diethylene triamine, pyridine and phenyl-hydrazine, said polyamide being less soluble in said component at ordinary temperature than at said 140° C. to 200° C. temperature, pouring the whole into a mould, and allowing the whole to cool down and to set.

References Cited by the Examiner

UNITED STATES PATENTS

| | | | |
|---|---|---|---|
| 3,049,454 | 8/62 | Stark | 149—2 |
| 3,094,444 | 6/63 | Hedrick et al. | 149—19 |

OTHER REFERENCES

Zaehringer: "Solid Propellant Rockets-Second Stage," American Rocket Co., Box 1112, Wyandotte, Mich. (1958), pp. 6, 210.

CARL D. QUARFORTH, *Primary Examiner.*

REUBEN EPSTEIN, *Examiner.*